(12) United States Patent
Kesavan et al.

(10) Patent No.: US 12,381,726 B2
(45) Date of Patent: Aug. 5, 2025

(54) GRANTING SELECTIVE ACCESS TO AN ENCRYPTED CONVERSATION HISTORY

(71) Applicant: Zoom Video Communications, Inc., San Jose, CA (US)

(72) Inventors: Balachandar Ganesh Kesavan, New York, NY (US); Antonio Marcedone, New York, NY (US)

(73) Assignee: Zoom Communications, Inc., San Jose, CA (US)

( * ) Notice: Subject to any disclaimer, the term of this patent is extended or adjusted under 35 U.S.C. 154(b) by 193 days.

(21) Appl. No.: 18/360,191

(22) Filed: Jul. 27, 2023

(65) Prior Publication Data

US 2024/0275589 A1    Aug. 15, 2024

Related U.S. Application Data

(60) Provisional application No. 63/445,910, filed on Feb. 15, 2023.

(51) Int. Cl.
*H04L 9/08* (2006.01)

(52) U.S. Cl.
CPC .................... *H04L 9/088* (2013.01)

(58) Field of Classification Search
CPC .............................. H04L 9/088; H04L 9/0891
See application file for complete search history.

(56) References Cited

U.S. PATENT DOCUMENTS

| | | |
|---|---|---|
| 10,341,304 B1 | 7/2019 | Boutros et al. |
| 10,783,269 B1 | 9/2020 | Shraer et al. |
| 10,963,593 B1 | 3/2021 | Campagna et al. |
| 2004/0146015 A1* | 7/2004 | Cross ..................... H04L 9/0894 370/328 |
| 2005/0120203 A1* | 6/2005 | Yeh ..................... H04L 63/0823 380/277 |
| 2005/0138352 A1* | 6/2005 | Gauvreau ............. H04L 9/3247 713/153 |

(Continued)

OTHER PUBLICATIONS

EP International Search Report and Written Opinion for PCT/US2024/015331 mailed Jun. 11, 2024.

(Continued)

*Primary Examiner* — Ponnoreay Pich
(74) *Attorney, Agent, or Firm* — Kilpatrick Townsend & Stockton LLP

(57) ABSTRACT

Selective access to an encrypted conversation history can be granted as described herein. For example, a first client device can determine a message key used to encrypt messages associated with a conversation. The first client device can then generate a key ciphertext by: determining a prior secret key, determining a current secret key by hashing the prior secret key and the message key, and generating the key ciphertext by encrypting the prior secret key and the message key using the current secret key. The first client device can then transmit the key ciphertext to a server system. To grant the second client device with access to the encrypted messages, the first client device can transmit the current secret key to the second client device, which can obtain the key ciphertext from the server system and apply the current secret key to derive the message key and decrypt the messages.

20 Claims, 8 Drawing Sheets

(56) References Cited

U.S. PATENT DOCUMENTS

| | | | |
|---|---|---|---|
| 2007/0086593 A1* | 4/2007 | Denning | H04L 63/0428 380/286 |
| 2017/0118183 A1 | 4/2017 | Shin et al. | |
| 2022/0376895 A1 | 11/2022 | Booth et al. | |

OTHER PUBLICATIONS

EP International Search Report and Written Opinion for PCT/US2024/015328 mailed Jun. 14, 2024.

* cited by examiner

GRANTING SELECTIVE ACCESS TO AN ENCRYPTED CONVERSATION HISTORY

CROSS-REFERENCE TO RELATED APPLICATION

This application claims priority to U.S. Provisional Application No. 63/445,910 filed Feb. 15, 2023 and titled "COMPACT KEY STORAGE," the entirety of which is hereby incorporated by reference herein.

TECHNICAL FIELD

The present application generally relates to chat messaging and, more particularly, relates to granting selective access to an encrypted conversation history.

BRIEF DESCRIPTION OF THE DRAWINGS

The accompanying drawings, which are incorporated into and constitute a part of this specification, illustrate one or more certain examples and, together with the description of the examples, serve to explain the principles and implementations of the certain examples.

DETAILED DESCRIPTION

Figure 1:
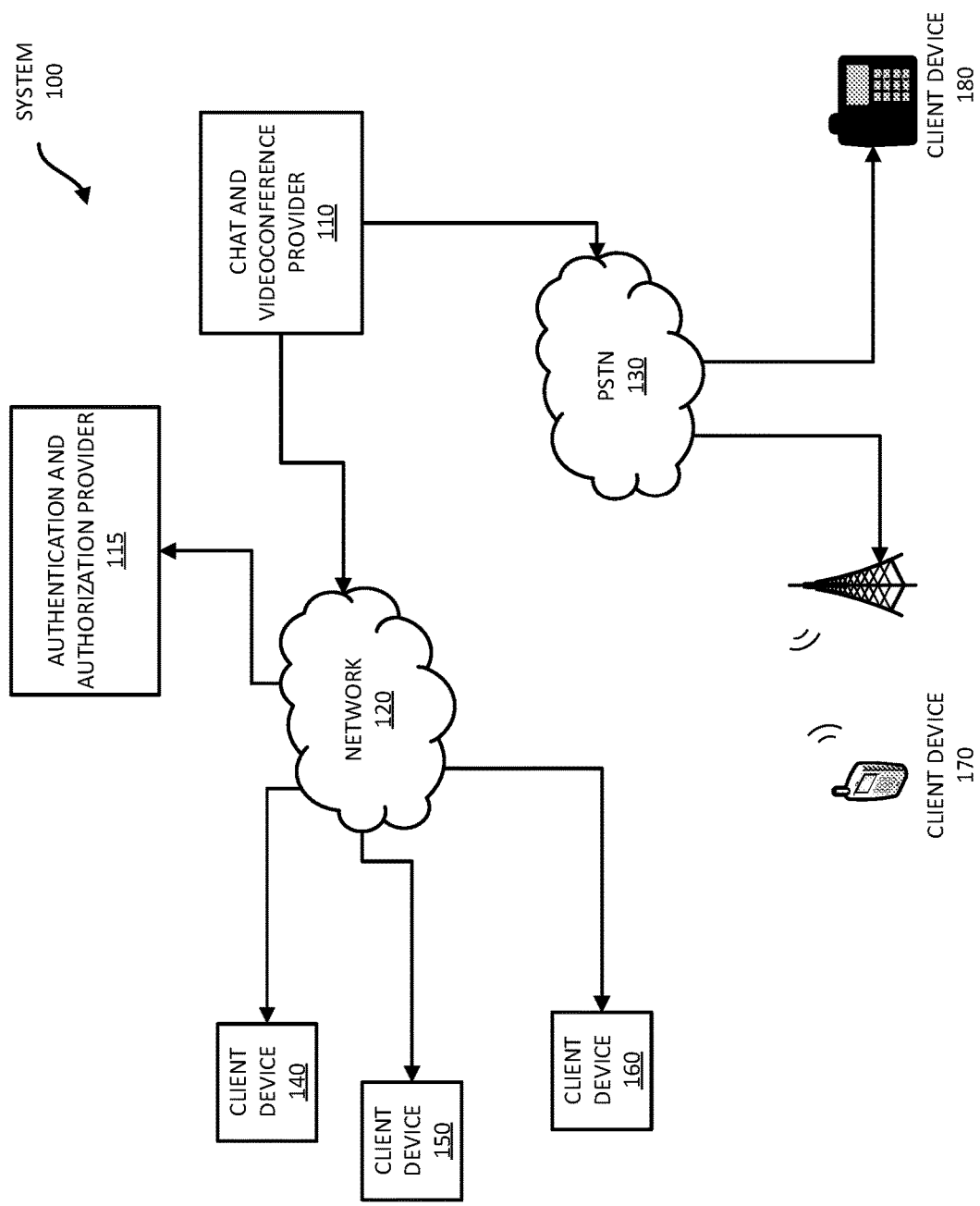
FIG. 1 shows an example of a system for providing videoconferencing and chat functionality to various client devices according to some aspects of the present disclosure.

Examples are described herein in the context of granting selective access to an encrypted conversation history. Those of ordinary skill in the art will realize that the following description is illustrative only and is not intended to be in any way limiting. Reference will now be made in detail to implementations of examples as illustrated in the accompanying drawings. The same reference indicators will be used throughout the drawings and the following description to refer to the same or like items.

In the interest of clarity, not all of the routine features of the examples described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another.

One common way in which people converse over the Internet is through text chats. To engage in a text chat conversation, the participants can execute chat client software on their client devices. The chat client software may be a specialized chat-client application, a website browser, or any other suitable software for facilitating the chat conversation. The chat client software can generate chat interfaces through which the users can submit their messages (e.g., text chat messages) and view messages sent by other participants in the chat conversation. While in some situations these text chats may occur directly via peer-to-peer connections, in most cases these text chats are facilitated by chat service providers. For example, users may chat with one another using Zoom Chat by Zoom Video Communications® ("Zoom"). Zoom Chat is a cloud-based chat service that allows the participants to engage in text chats with one another. Such chat service providers can employ one or more chat servers to facilitate the conversation.

In some cases, a conversation may include sensitive information, such as personal or confidential information. In those situations, it may be desirable to encrypt some or all of the messages in the conversation. To implement this encryption, a client device participating in the conversation can generate an encryption/decryption key, which is referred to herein as a message key. The message key can be a symmetric key. In some examples, the client device may be a host device associated with a host of the conversation. After generating the message key, the client device can then transmit the message key to the other client devices participating in the conversation, so that they can encrypt and decrypt messages in the conversation. Over the course of the conversation, the client device may change the message key one or more times in response to various events. For example, the client device may automatically rotate the message key at some predefined time interval, such as every five minutes. As another example, the client device may automatically rotate the message key when a participant leaves the conversation, so that the participant cannot access subsequent messages. Each time the client device generates a new message key, the client device can transmit the new message key to the other client devices still participating in the conversation, so that they can continue to encrypt and decrypt subsequent messages in the conversation.

There may be certain situations where it is desirable to selectively allow a specific user to view some or all of the conversation history. For example, the specific user may not have participated in the conversation (so far) but, nevertheless, may want to access some or all of the conversation history. But because different parts of the conversation history may be encrypted using different message keys, it may be challenging to easily grant that user access to the conversation history. As another example, a user that previously participated in the conversation may have deleted the message keys, either intentionally or accidentally, and may want to access the conversation history. But normally it may be challenging to easily grant that user access to the conversation history.

Some examples of the present disclosure can overcome one or more of the abovementioned problems by providing a quick and easy way to selectively grant a target user access to some or all of an encrypted conversation history. For example, over the course of a conversation, a client device can sequentially generate message keys for use in encrypting and decrypting messages in the conversation. After generating each new message key, the client device can generate a new secret key ($SK_n$) by hashing the new message key with a prior secret key ($SK_{n-1}$). The prior secret key can be the secret key from the immediately prior iteration of the process. For the first iteration, the prior secret key can be set to a predefined default value. After generating the new secret key, the client device can generate a key ciphertext by encrypting the new message key and prior secret key using the new secret key. The client device can then upload the key ciphertext to a server, such as the chat server hosting the conversation. After uploading the key ciphertext to the server, the client device can remove the prior secret key and the key ciphertext from memory. As a result, while there may be a negligible amount of time in which the client device has both the new secret key and the prior secret key, for the majority of the time, the client device may only store a single secret key (the newest secret key) in memory. This can improve security and memory usage.

In some examples, multiple client devices can work together to generate the key ciphertexts and upload them to the server. For example, multiple client devices participating in the conversation may have access to the message keys, so that they can encrypt and decrypt messages. Because the client devices can each have access to some or all of the message keys, each of the client devices can generate a subset of the key ciphertexts based on a subset of the message keys and upload it to the server. Thus, the client devices can coordinate the key-ciphertext generation with one another to help prevent against duplication of work. This can help spread the burden of key ciphertext generation among the client devices.

To provide selective access to the conversation history to a target user, a client device can transmit one of the secret keys ($SK_n$) to the target user's client device, referred to herein as the target device. The target device can then obtain the corresponding key ciphertext ($C_n$) from the server. The target device can decrypt the key ciphertext using the secret key to obtain the corresponding message key ($MK_n$) and the immediately prior secret key ($SK_{n-1}$). The target device can then decrypt the key ciphertext ($C_{n-1}$) corresponding to the prior secret key ($SK_{n-1}$) using that secret key. This can produce the corresponding message key ($MK_{n-1}$) and its immediately prior secret key ($SK_{n-2}$). This process can repeat, with the target device iteratively decrypting the key ciphertexts in a reverse order, starting from the key ciphertext corresponding to the provided secret key, to derive some corresponding message keys that were used to encrypt corresponding portions of the conversation. Having obtained the message keys, the target device can then decrypt the corresponding encrypted messages in the conversation.

It will be appreciated that, if the secret key is the newest secret key, the target device can decrypt all of the conversation history using the above techniques. And if the secret key is not the newest secret key, then the target device may only be able to decrypt a portion of the conversation history. Thus, the target device can be selectively granted a certain level of access to the conversation history based on the secret key that is provided to the target device.

Using the above techniques, the client device may only need to transmit a single communication with a single secret key (e.g., the newest secret key) to the target device to allow the target user to decrypt some or all of the conversation history. This may reduce the amount of processing power, bandwidth, and memory consumed by the client device in selectively granting access to the target user to view the encrypted conversation.

This illustrative example is given to introduce the reader to the general subject matter discussed herein and the disclosure is not limited to this example. The following sections describe various additional non-limiting examples.

Referring now to FIG. 1, FIG. 1 shows an example of a system 100 that provides videoconferencing functionality to various client devices. The system 100 includes a chat and videoconference provider 110 that is connected to multiple communication networks 120, 130, through which various client devices 140-180 can participate in videoconferences hosted by the chat and videoconference provider 110. For example, the chat and videoconference provider 110 can be located within a private network to provide video conferencing services to devices within the private network, or it can be connected to a public network, e.g., the internet, so it may be accessed by anyone. Some examples may even provide a hybrid model in which a chat and videoconference provider 110 may supply components to enable a private organization to host private internal videoconferences or to connect its system to the chat and videoconference provider 110 over a public network.

The system optionally also includes one or more authentication and authorization providers, e.g., authentication and authorization provider 115, which can provide authentication and authorization services to users of the client devices 140-160. Authentication and authorization provider 115 may authenticate users to the chat and videoconference provider 110 and manage user authorization for the various services provided by chat and videoconference provider 110. In this example, the authentication and authorization provider 115 is operated by a different entity than the chat and videoconference provider 110, though in some examples, they may be the same entity.

Figure 2:
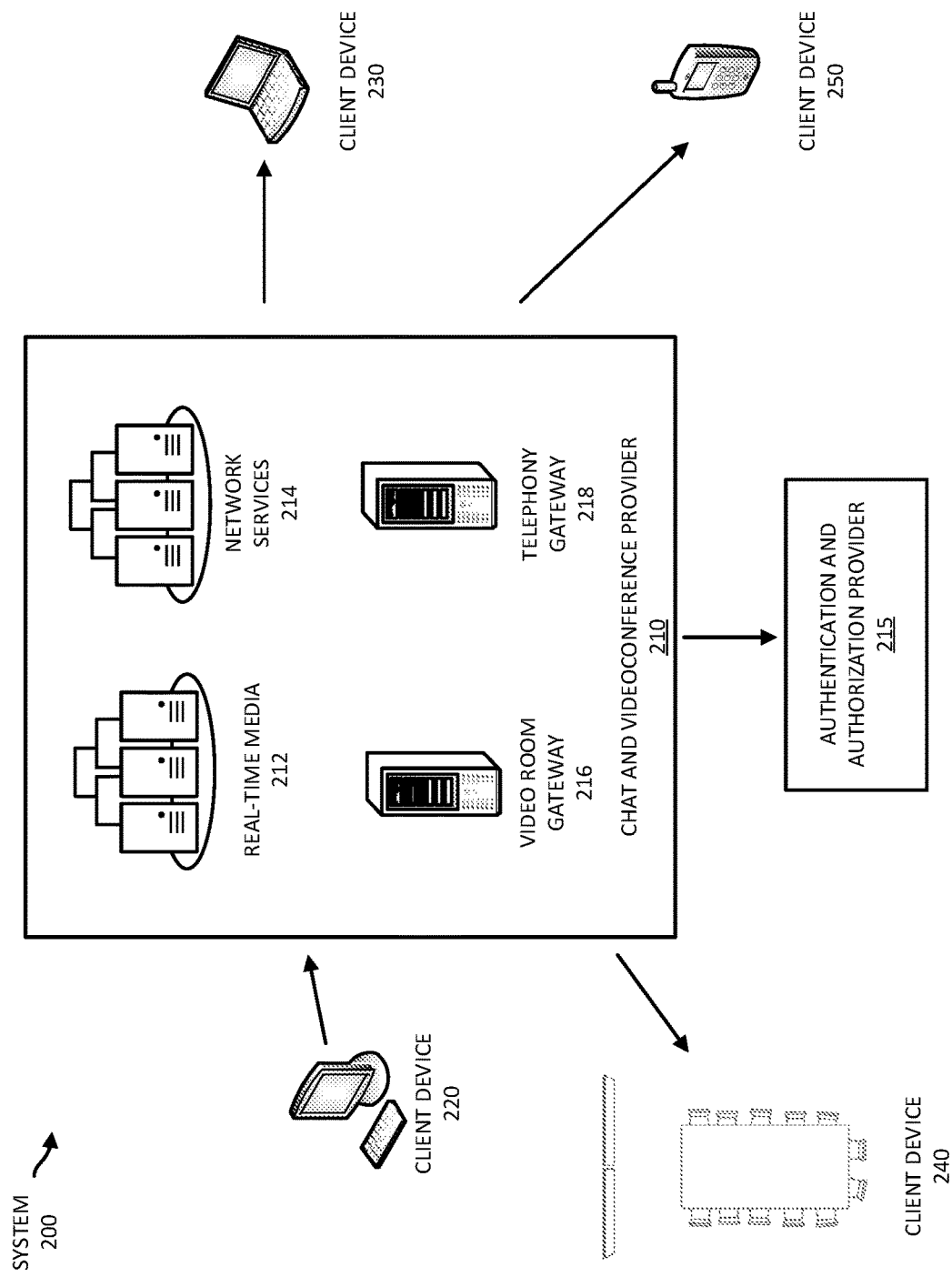
FIG. 2 shows another example of a system for providing videoconferencing and chat functionality to various client device according to some aspects of the present disclosure.

Chat and videoconference provider 110 allows clients to create videoconference meetings (or "meetings") and invite others to participate in those meetings as well as perform other related functionality, such as recording the meetings, generating transcripts from meeting audio, generating summaries and translations from meeting audio, manage user functionality in the meetings, enable text messaging during the meetings, create and manage breakout rooms from the virtual meeting, etc. FIG. 2, described below, provides a more detailed description of the architecture and functionality of the chat and videoconference provider 110. It should be understood that the term "meeting" encompasses the term "webinar" used herein.

Meetings in this example chat and videoconference provider 110 are provided in virtual rooms to which participants are connected. The room in this context is a construct provided by a server that provides a common point at which the various video and audio data is received before being multiplexed and provided to the various participants. While a "room" is the label for this concept in this disclosure, any suitable functionality that enables multiple participants to participate in a common videoconference may be used.

To create a meeting with the chat and videoconference provider 110, a user may contact the chat and videoconference provider 110 using a client device 140-180 and select an option to create a new meeting. Such an option may be provided in a webpage accessed by a client device 140-160 or a client application executed by a client device 140-160. For telephony devices, the user may be presented with an audio menu that they may navigate by pressing numeric buttons on their telephony device. To create the meeting, the chat and videoconference provider 110 may prompt the user for certain information, such as a date, time, and duration for the meeting, a number of participants, a type of encryption to use, whether the meeting is confidential or open to the public, etc. After receiving the various meeting settings, the chat and videoconference provider may create a record for the meeting and generate a meeting identifier and, in some examples, a corresponding meeting password or passcode (or other authentication information), all of which meeting information is provided to the meeting host.

After receiving the meeting information, the user may distribute the meeting information to one or more users to invite them to the meeting. To begin the meeting at the scheduled time (or immediately, if the meeting was set for an immediate start), the host provides the meeting identifier and, if applicable, corresponding authentication information (e.g., a password or passcode). The videoconference system then initiates the meeting and may admit users to the meeting. Depending on the options set for the meeting, the users may be admitted immediately upon providing the appropriate meeting identifier (and authentication information, as appropriate), even if the host has not yet arrived, or the users may be presented with information indicating that the meeting has not yet started, or the host may be required to specifically admit one or more of the users.

During the meeting, the participants may employ their client devices 140-180 to capture audio or video information and stream that information to the chat and videoconference provider 110. They also receive audio or video information from the chat and videoconference provider 110, which is displayed by the respective client device 140 to enable the various users to participate in the meeting.

At the end of the meeting, the host may select an option to terminate the meeting, or it may terminate automatically at a scheduled end time or after a predetermined duration. When the meeting terminates, the various participants are disconnected from the meeting, and they will no longer receive audio or video streams for the meeting (and will stop transmitting audio or video streams). The chat and videoconference provider 110 may also invalidate the meeting information, such as the meeting identifier or password/passcode.

To provide such functionality, one or more client devices 140-180 may communicate with the chat and videoconference provider 110 using one or more communication networks, such as network 120 or the public switched telephone network ("PSTN") 130. The client devices 140-180 may be any suitable computing or communication devices that have audio or video capability. For example, client devices 140-160 may be conventional computing devices, such as desktop or laptop computers having processors and computer-readable media, connected to the chat and videoconference provider 110 using the internet or other suitable computer network. Suitable networks include the internet, any local area network ("LAN"), metro area network ("MAN"), wide area network ("WAN"), cellular network (e.g., 3G, 4G, 4G LTE, 5G, etc.), or any combination of these. Other types of computing devices may be used instead or as well, such as tablets, smartphones, and dedicated video conferencing equipment. Each of these devices may provide both audio and video capabilities and may enable one or more users to participate in a videoconference meeting hosted by the chat and videoconference provider 110.

In addition to the computing devices discussed above, client devices 140-180 may also include one or more telephony devices, such as cellular telephones (e.g., cellular telephone 170), internet protocol ("IP") phones (e.g., telephone 180), or conventional telephones. Such telephony devices may allow a user to make conventional telephone calls to other telephony devices using the PSTN, including the chat and videoconference provider 110. It should be appreciated that certain computing devices may also provide telephony functionality and may operate as telephony devices. For example, smartphones typically provide cellular telephone capabilities and thus may operate as telephony devices in the system 100 shown in FIG. 1. In addition, conventional computing devices may execute software to enable telephony functionality, which may allow the user to make and receive phone calls, e.g., using a headset and microphone. Such software may communicate with a PSTN gateway to route the call from a computer network to the PSTN. Thus, telephony devices encompass any devices that can make conventional telephone calls and are not limited solely to dedicated telephony devices like conventional telephones.

Referring again to client devices 140-160, the client devices 140-160 contact the chat and videoconference provider 110 using network 120 and may provide information to the chat and videoconference provider 110 to access functionality provided by the chat and videoconference provider 110, such as access to create new meetings or join existing meetings. To do so, the client devices 140-160 may provide user authentication information, meeting identifiers, meeting passwords or passcodes, etc. In examples that employ an authentication and authorization provider 115, a client device, e.g., client devices 140-160, may operate in conjunction with an authentication and authorization provider 115 to provide authentication and authorization information or other user information to the chat and videoconference provider 110.

An authentication and authorization provider 115 may be any entity trusted by the chat and videoconference provider 110 that can help authenticate a user to the chat and videoconference provider 110 and authorize the user to access the services provided by the chat and videoconference provider 110. For example, a trusted entity may be a server operated by a business or other organization with whom the user has created an account, including authentication and authorization information, such as an employer or trusted third-party. The user may sign into the authentication and authorization provider 115, such as by providing a username and password, to access their account information at the authentication and authorization provider 115. The account information includes information established and maintained at the authentication and authorization provider 115 that can be used to authenticate and facilitate authorization for a particular user, irrespective of the client device they may be using. An example of account information may be an email account established at the authentication and authorization provider 115 by the user and secured by a password or additional security features, such as single sign-on, hardware tokens, two-factor authentication, etc. However, such account information may be distinct from functionality such as email. For example, a health care provider may establish accounts for its patients. And while the related account information may have associated email accounts, the account information is distinct from those email accounts.

Thus, a user's account information relates to a secure, verified set of information that can be used to authenticate and provide authorization services for a particular user and should be accessible only by that user. By properly authenticating, the associated user may then verify themselves to other computing devices or services, such as the chat and videoconference provider 110. The authentication and authorization provider 115 may require the explicit consent of the user before allowing the chat and videoconference provider 110 to access the user's account information for authentication and authorization purposes.

Once the user is authenticated, the authentication and authorization provider 115 may provide the chat and videoconference provider 110 with information about services the user is authorized to access. For instance, the authentication and authorization provider 115 may store information about user roles associated with the user. The user roles may include collections of services provided by the chat and videoconference provider 110 that users assigned to those user roles are authorized to use. Alternatively, more or less granular approaches to user authorization may be used.

When the user accesses the chat and videoconference provider 110 using a client device, the chat and videoconference provider 110 communicates with the authentication and authorization provider 115 using information provided by the user to verify the user's account information. For example, the user may provide a username or cryptographic signature associated with an authentication and authorization provider 115. The authentication and authorization provider 115 then either confirms the information presented by the user or denies the request. Based on this response, the chat and videoconference provider 110 either provides or denies access to its services, respectively.

For telephony devices, e.g., client devices 170-180, the user may place a telephone call to the chat and videoconference provider 110 to access videoconference services. After the call is answered, the user may provide information regarding a videoconference meeting, e.g., a meeting identifier ("ID"), a passcode or password, etc., to allow the telephony device to join the meeting and participate using audio devices of the telephony device, e.g., microphone(s) and speaker(s), even if video capabilities are not provided by the telephony device.

Because telephony devices typically have more limited functionality than conventional computing devices, they may be unable to provide certain information to the chat and videoconference provider 110. For example, telephony devices may be unable to provide authentication information to authenticate the telephony device or the user to the chat and videoconference provider 110. Thus, the chat and videoconference provider 110 may provide more limited functionality to such telephony devices. For example, the user may be permitted to join a meeting after providing meeting information, e.g., a meeting identifier and passcode, but only as an anonymous participant in the meeting. This may restrict their ability to interact with the meetings in some examples, such as by limiting their ability to speak in the meeting, hear or view certain content shared during the meeting, or access other meeting functionality, such as joining breakout rooms or engaging in text chat with other participants in the meeting.

It should be appreciated that users may choose to participate in meetings anonymously and decline to provide account information to the chat and videoconference provider 110, even in cases where the user could authenticate and employs a client device capable of authenticating the user to the chat and videoconference provider 110. The chat and videoconference provider 110 may determine whether to allow such anonymous users to use services provided by the chat and videoconference provider 110. Anonymous users, regardless of the reason for anonymity, may be restricted as discussed above with respect to users employing telephony devices, and in some cases may be prevented from accessing certain meetings or other services, or may be entirely prevented from accessing the chat and videoconference provider 110.

Referring again to chat and videoconference provider 110, in some examples, it may allow client devices 140-160 to encrypt their respective video and audio streams to help improve privacy in their meetings. Encryption may be provided between the client devices 140-160 and the chat and videoconference provider 110 or it may be provided in an end-to-end configuration where multimedia streams (e.g., audio or video streams) transmitted by the client devices 140-160 are not decrypted until they are received by another client device 140-160 participating in the meeting. Encryption may also be provided during only a portion of a communication, for example encryption may be used for otherwise unencrypted communications that cross international borders.

Client-to-server encryption may be used to secure the communications between the client devices 140-160 and the chat and videoconference provider 110, while allowing the chat and videoconference provider 110 to access the decrypted multimedia streams to perform certain processing, such as recording the meeting for the participants or generating transcripts of the meeting for the participants. End-to-end encryption may be used to keep the meeting entirely private to the participants without any worry about a chat and videoconference provider 110 having access to the substance of the meeting. Any suitable encryption methodology may be employed, including key-pair encryption of the streams. For example, to provide end-to-end encryption, the meeting host's client device may obtain public keys for each of the other client devices participating in the meeting and securely exchange a set of keys to encrypt and decrypt multimedia content transmitted during the meeting. Thus, the client devices 140-160 may securely communicate with each other during the meeting. Further, in some examples, certain types of encryption may be limited by the types of devices participating in the meeting. For example, telephony devices may lack the ability to encrypt and decrypt multimedia streams. Thus, while encrypting the multimedia streams may be desirable in many instances, it is not required as it may prevent some users from participating in a meeting.

By using the example system shown in FIG. 1, users can create and participate in meetings using their respective client devices 140-180 via the chat and videoconference provider 110. Further, such a system enables users to use a wide variety of different client devices 140-180 from traditional standards-based video conferencing hardware to dedicated video conferencing equipment to laptop or desktop computers to handheld devices to legacy telephony devices, etc.

Referring now to FIG. 2, FIG. 2 shows an example system 200 in which a chat and videoconference provider 210 provides videoconferencing functionality to various client devices 220-250. The client devices 220-250 include two conventional computing devices 220-230, dedicated equipment for a videoconference room 240, and a telephony device 250. Each client device 220-250 communicates with the chat and videoconference provider 210 over a communications network, such as the internet for client devices 220-240 or the PSTN for client device 250, generally as described above with respect to FIG. 1. The chat and videoconference provider 210 is also in communication with one or more authentication and authorization providers 215, which can authenticate various users to the chat and videoconference provider 210 generally as described above with respect to FIG. 1.

In this example, the chat and videoconference provider 210 employs multiple different servers (or groups of servers) to provide different examples of videoconference functionality, thereby enabling the various client devices to create and participate in videoconference meetings. The chat and videoconference provider 210 uses one or more real-time media servers 212, one or more network services servers 214, one or more video room gateways 216, one or more message and presence gateways 217, and one or more telephony gateways 218. Each of these servers 212-218 is connected to one or more communications networks to enable them to collectively provide access to and participation in one or more videoconference meetings to the client devices 220-250.

The real-time media servers 212 provide multiplexed multimedia streams to meeting participants, such as the client devices 220-250 shown in FIG. 2. While video and audio streams typically originate at the respective client devices, they are transmitted from the client devices 220-250 to the chat and videoconference provider 210 via one or more networks where they are received by the real-time media servers 212. The real-time media servers 212 determine which protocol is optimal based on, for example, proxy settings and the presence of firewalls, etc. For example, the client device might select among UDP, TCP, TLS, or HTTPS for audio and video and UDP for content screen sharing.

The real-time media servers 212 then multiplex the various video and audio streams based on the target client device and communicate multiplexed streams to each client device. For example, the real-time media servers 212 receive audio and video streams from client devices 220-240 and only an audio stream from client device 250. The real-time media servers 212 then multiplex the streams received from devices 230-250 and provide the multiplexed stream to client device 220. The real-time media servers 212 are adaptive, for example, reacting to real-time network and client changes, in how they provide these streams. For example, the real-time media servers 212 may monitor parameters such as a client's bandwidth CPU usage, memory and network I/O as well as network parameters such as packet loss, latency and jitter to determine how to modify the way in which streams are provided.

The client device 220 receives the stream, performs any decryption, decoding, and demultiplexing on the received streams, and then outputs the audio and video using the client device's video and audio devices. In this example, the real-time media servers do not multiplex client device 220's own video and audio feeds when transmitting streams to it. Instead, each client device 220-250 only receives multimedia streams from other client devices 220-250. For telephony devices that lack video capabilities, e.g., client device 250, the real-time media servers 212 only deliver multiplex audio streams. The client device 220 may receive multiple streams for a particular communication, allowing the client device 220 to switch between streams to provide a higher quality of service.

In addition to multiplexing multimedia streams, the real-time media servers 212 may also decrypt incoming multimedia stream in some examples. As discussed above, multimedia streams may be encrypted between the client devices 220-250 and the chat and videoconference provider 210. In some such examples, the real-time media servers 212 may decrypt incoming multimedia streams, multiplex the multimedia streams appropriately for the various clients, and encrypt the multiplexed streams for transmission.

As mentioned above with respect to FIG. 1, the chat and videoconference provider 210 may provide certain functionality with respect to unencrypted multimedia streams at a user's request. For example, the meeting host may be able to request that the meeting be recorded or that a transcript of the audio streams be prepared, which may then be performed by the real-time media servers 212 using the decrypted multimedia streams, or the recording or transcription functionality may be off-loaded to a dedicated server (or servers), e.g., cloud recording servers, for recording the audio and video streams. In some examples, the chat and videoconference provider 210 may allow a meeting participant to notify it of inappropriate behavior or content in a meeting. Such a notification may trigger the real-time media servers to 212 record a portion of the meeting for review by the chat and videoconference provider 210. Still other functionality may be implemented to take actions based on the decrypted multimedia streams at the chat and videoconference provider, such as monitoring video or audio quality, adjusting or changing media encoding mechanisms, etc.

It should be appreciated that multiple real-time media servers 212 may be involved in communicating data for a single meeting and multimedia streams may be routed through multiple different real-time media servers 212. In addition, the various real-time media servers 212 may not be co-located, but instead may be located at multiple different geographic locations, which may enable high-quality communications between clients that are dispersed over wide geographic areas, such as being located in different countries or on different continents. Further, in some examples, one or more of these servers may be co-located on a client's premises, e.g., at a business or other organization. For example, different geographic regions may each have one or more real-time media servers 212 to enable client devices in the same geographic region to have a high-quality connection into the chat and videoconference provider 210 via local servers 212 to send and receive multimedia streams, rather than connecting to a real-time media server located in a different country or on a different continent. The local real-time media servers 212 may then communicate with physically distant servers using high-speed network infrastructure, e.g., internet backbone network(s), that otherwise might not be directly available to client devices 220-250 themselves. Thus, routing multimedia streams may be distributed throughout the videoconference system and across many different real-time media servers 212.

Turning to the network services servers 214, these servers 214 provide administrative functionality to enable client devices to create or participate in meetings, send meeting invitations, create or manage user accounts or subscriptions, and other related functionality. Further, these servers may be configured to perform different functionalities or to operate at different levels of a hierarchy, e.g., for specific regions or localities, to manage portions of the chat and videoconference provider under a supervisory set of servers. When a client device 220-250 accesses the chat and videoconference provider 210, it will typically communicate with one or more network services servers 214 to access their account or to participate in a meeting.

When a client device 220-250 first contacts the chat and videoconference provider 210 in this example, it is routed to a network services server 214. The client device may then provide access credentials for a user, e.g., a username and password or single sign-on credentials, to gain authenticated access to the chat and videoconference provider 210. This process may involve the network services servers 214 contacting an authentication and authorization provider 215 to verify the provided credentials. Once the user's credentials have been accepted, and the user has consented, the network services servers 214 may perform administrative functionality, like updating user account information, if the user has account information stored with the chat and videoconference provider 210, or scheduling a new meeting, by interacting with the network services servers 214. Authentication and authorization provider 215 may be used to determine which administrative functionality a given user may access according to assigned roles, permissions, groups, etc.

In some examples, users may access the chat and videoconference provider 210 anonymously. When communicating anonymously, a client device 220-250 may communicate with one or more network services servers 214 but only provide information to create or join a meeting, depending on what features the chat and videoconference provider allows for anonymous users. For example, an anonymous user may access the chat and videoconference provider using client device 220 and provide a meeting ID and passcode. The network services server 214 may use the meeting ID to identify an upcoming or on-going meeting and verify the passcode is correct for the meeting ID. After doing so, the network services server(s) 214 may then communicate information to the client device 220 to enable the client device 220 to join the meeting and communicate with appropriate real-time media servers 212.

In cases where a user wishes to schedule a meeting, the user (anonymous or authenticated) may select an option to schedule a new meeting and may then select various meeting options, such as the date and time for the meeting, the duration for the meeting, a type of encryption to be used, one or more users to invite, privacy controls (e.g., not allowing anonymous users, preventing screen sharing, manually authorize admission to the meeting, etc.), meeting recording options, etc. The network services servers 214 may then create and store a meeting record for the scheduled meeting. When the scheduled meeting time arrives (or within a threshold period of time in advance), the network services server(s) 214 may accept requests to join the meeting from various users.

To handle requests to join a meeting, the network services server(s) 214 may receive meeting information, such as a meeting ID and passcode, from one or more client devices 220-250. The network services server(s) 214 locate a meeting record corresponding to the provided meeting ID and then confirm whether the scheduled start time for the meeting has arrived, whether the meeting host has started the meeting, and whether the passcode matches the passcode in the meeting record. If the request is made by the host, the network services server(s) 214 activates the meeting and connects the host to a real-time media server 212 to enable the host to begin sending and receiving multimedia streams.

Once the host has started the meeting, subsequent users requesting access will be admitted to the meeting if the meeting record is located and the passcode matches the passcode supplied by the requesting client device 220-250. In some examples additional access controls may be used as well. But if the network services server(s) 214 determines to admit the requesting client device 220-250 to the meeting, the network services server 214 identifies a real-time media server 212 to handle multimedia streams to and from the requesting client device 220-250 and provides information to the client device 220-250 to connect to the identified real-time media server 212. Additional client devices 220-250 may be added to the meeting as they request access through the network services server(s) 214.

After joining a meeting, client devices will send and receive multimedia streams via the real-time media servers 212, but they may also communicate with the network services servers 214 as needed during meetings. For example, if the meeting host leaves the meeting, the network services server(s) 214 may appoint another user as the new meeting host and assign host administrative privileges to that user. Hosts may have administrative privileges to allow them to manage their meetings, such as by enabling or disabling screen sharing, muting or removing users from the meeting, assigning or moving users to the mainstage or a breakout room if present, recording meetings, etc. Such functionality may be managed by the network services server(s) 214.

For example, if a host wishes to remove a user from a meeting, they may select a user to remove and issue a command through a user interface on their client device. The command may be sent to a network services server 214, which may then disconnect the selected user from the corresponding real-time media server 212. If the host wishes to remove one or more participants from a meeting, such a command may also be handled by a network services server 214, which may terminate the authorization of the one or more participants for joining the meeting.

In addition to creating and administering on-going meetings, the network services server(s) 214 may also be responsible for closing and tearing-down meetings once they have been completed. For example, the meeting host may issue a command to end an on-going meeting, which is sent to a network services server 214. The network services server 214 may then remove any remaining participants from the meeting, communicate with one or more real time media servers 212 to stop streaming audio and video for the meeting, and deactivate, e.g., by deleting a corresponding passcode for the meeting from the meeting record, or delete the meeting record(s) corresponding to the meeting. Thus, if a user later attempts to access the meeting, the network services server(s) 214 may deny the request.

Depending on the functionality provided by the chat and videoconference provider, the network services server(s) 214 may provide additional functionality, such as by providing private meeting capabilities for organizations, special types of meetings (e.g., webinars), etc. Such functionality may be provided according to various examples of video conferencing providers according to this description.

Referring now to the video room gateway servers 216, these servers 216 provide an interface between dedicated video conferencing hardware, such as may be used in dedicated video conferencing rooms. Such video conferencing hardware may include one or more cameras and microphones and a computing device designed to receive video and audio streams from each of the cameras and microphones and connect with the chat and videoconference provider 210. For example, the video conferencing hardware may be provided by the chat and videoconference provider to one or more of its subscribers, which may provide access credentials to the video conferencing hardware to use to connect to the chat and videoconference provider 210.

The video room gateway servers 216 provide specialized authentication and communication with the dedicated video conferencing hardware that may not be available to other client devices 220-230, 250. For example, the video conferencing hardware may register with the chat and videoconference provider when it is first installed and the video room gateway may authenticate the video conferencing hardware using such registration as well as information provided to the video room gateway server(s) 216 when dedicated video conferencing hardware connects to it, such as device ID information, subscriber information, hardware capabilities, hardware version information etc. Upon receiving such information and authenticating the dedicated video conferencing hardware, the video room gateway server(s) 216 may interact with the network services servers 214 and real-time media servers 212 to allow the video conferencing hardware to create or join meetings hosted by the chat and videoconference provider 210.

Referring now to the telephony gateway servers 218, these servers 218 enable and facilitate telephony devices' participation in meetings hosted by the chat and videoconference provider 210. Because telephony devices communicate using the PSTN and not using computer networking protocols, such as TCP/IP, the telephony gateway servers 218 act as an interface that converts between the PSTN, and the networking system used by the chat and videoconference provider 210.

For example, if a user uses a telephony device to connect to a meeting, they may dial a phone number corresponding to one of the chat and videoconference provider's telephony gateway servers 218. The telephony gateway server 218 will answer the call and generate audio messages requesting information from the user, such as a meeting ID and passcode. The user may enter such information using buttons on the telephony device, e.g., by sending dual-tone multi-frequency ("DTMF") audio streams to the telephony gateway server 218. The telephony gateway server 218 determines the numbers or letters entered by the user and provides the meeting ID and passcode information to the network services servers 214, along with a request to join or start the meeting, generally as described above. Once the telephony client device 250 has been accepted into a meeting, the telephony gateway server is instead joined to the meeting on the telephony device's behalf.

After joining the meeting, the telephony gateway server 218 receives an audio stream from the telephony device and provides it to the corresponding real-time media server 212 and receives audio streams from the real-time media server 212, decodes them, and provides the decoded audio to the telephony device. Thus, the telephony gateway servers 218 operate essentially as client devices, while the telephony device operates largely as an input/output device, e.g., a microphone and speaker, for the corresponding telephony gateway server 218, thereby enabling the user of the telephony device to participate in the meeting despite not using a computing device or video.

It should be appreciated that the components of the chat and videoconference provider 210 discussed above are merely examples of such devices and an example architecture. Some videoconference providers may provide more or less functionality than described above and may not separate functionality into different types of servers as discussed above. Instead, any suitable servers and network architectures may be used according to different examples.

Figure 3:
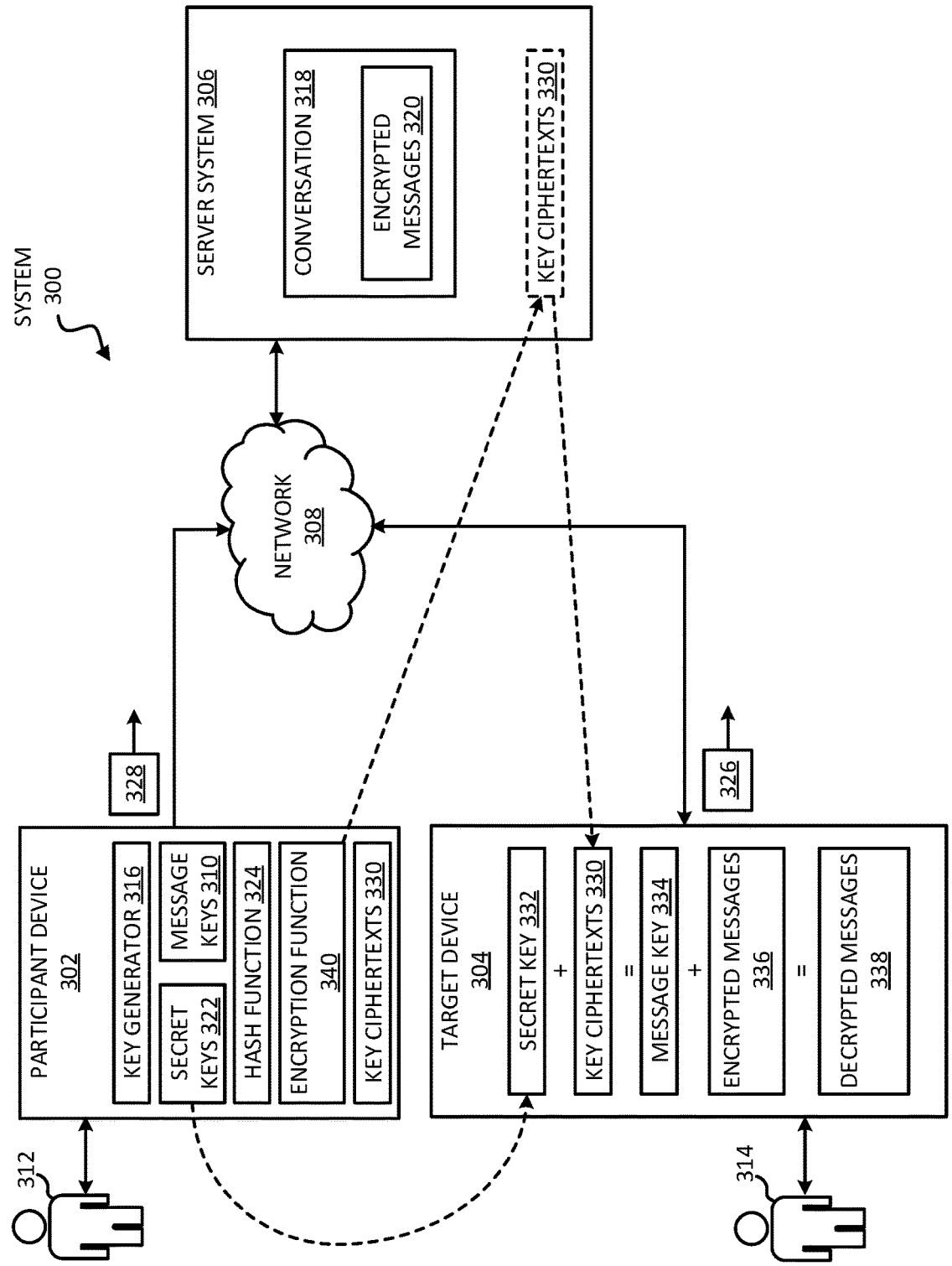
FIG. 3 shows an example of a system for granting selective access to an encrypted conversation history according to some aspects of the present disclosure.

Turning now to FIG. 3, shown is an example of a system 300 for granting selective access to an encrypted conversation history according to some aspects of the present disclosure. The system 300 includes a participant device 302 (e.g., any of the client devices described above) associated with a participant 312 of a conversation 318, such as a text chat conversation. In some examples, the participant device 302 is a host device associated with a host of the conversation 318. Multiple participant devices may participate in the conversation 318. The participant devices can each execute chat client software to engage in the conversation 318 via one or more networks 308, such as the Internet.

The conversation 318 may be facilitated by a server system 306. For example, the server system 306 can route messages back-and-forth between the participant devices via the one or more networks 308, store a conversation history (e.g., encrypted messages 320) associated with the conversation 318, and perform other functions. The server system 306 may be operated by a chat and videoconference provider, such as any of the chat and videoconference providers 110, 210 described above. The server system 306 can include one or more servers.

In some examples, the conversation 318 may be an encrypted conversation involving encrypted messages 320. The messages may be encrypted using encryption keys (e.g., message keys 310) generated by the participant device 302. For example, the participant device 302 can include a key generator 316. The key generator 316 can be software, hardware, or a combination thereof. The participant device 302 can use the key generator 316 to generate any number of message keys 310 over the course of the conversation 318. For example, the participant device 302 can use the key generator 316 to generate a new message key 310 each time the participant device 302 detects one or more events, such as the passage of a predefined time interval or a change in the participants in the conversation 318.

Each of the message keys 310 can be used to encrypt and decrypt messages between the conversation participants during a corresponding time interval for which the key is active. For example, each time a new message key is generated, the participant device 302 can transmit the new message key to the other participant devices for use in encrypting/decrypting subsequent messages. This can facilitate end-to-end encryption of the conversation 318. Because different message keys 310 are only active (e.g., designated for encrypting/decrypting messages) for their respective time periods, a message key that is active during one time period cannot be used to successfully decrypt messages from another time period.

Each time the participant device 302 generates a new message key ($MK_n$), the participant device 302 can generate a corresponding secret key ($SK_n$) 322. To do so, the participant device 302 can hash the new message key with the prior secret key ($SK_{n-1}$) from the prior iteration of the process. For example, the participant device 302 can generate the secret key by hashing the new message key and the prior secret key using a hashing function 324. For the first iteration, the prior secret key ($SK_{n-1}$) can be set to a predefined default value. Thus, for N message keys, there may be N+1 secret keys, where the first secret key is a default value and the remaining N secret keys are computed as discussed above.

After generating a new secret key 322 for each new message key 310, the participant device 302 can generate a key ciphertext 330 based on the prior secret key, the new message key, and the new secret key. For example, the participant device 302 can generate a key ciphertext ($C_n$) by encrypting the prior secret key ($SK_{n-1}$) and the new message key ($MK_n$) using the new secret key ($SK_n$). This encryption may be performed using an encryption function 340. After generating each of the key ciphertexts 330, the participant device 302 can transmit the key ciphertexts 330 to the server system 306 for storage thereon. The participant device 302 may then delete the key ciphertext 330 from memory. The participant device 302 may also delete the prior secret key from memory. For example, after generating a first key ciphertext corresponding to a first message key, the participant device 302 can transmit the first key ciphertext to the server system 306. The participant device 302 may also delete the first key ciphertext and the prior secret key (e.g., $SK_0$) from memory. As another example, after generating a second key ciphertext, the participant device 302 can transmit the second key ciphertext to the server system 306. The participant device 302 may also delete the second key ciphertext and the prior secret key (e.g., $SK_1$) from memory. Etc. In some examples, the participant device 302 can delete one or more of the prior message keys (e.g., the message keys not currently in use) from memory, which can further help to conserve memory space.

Using the above techniques, the participant device 302 may only store a single secret key (e.g., the newest secret key) and optionally a single message key (e.g., the newest message key) for the majority of the time. This can reduce the amount of memory consumed by key storage on the participant device 302. Of course, there may be a small time interval during the creation of the key ciphertext in which the newest secret key and the immediately prior secret key are both stored in memory. Similarly, the participant device 302 may only store a single key ciphertext (e.g., the newest key ciphertext) for a relatively short timespan; namely, the time between its creation and when it's uploaded to the server system 306. This can reduce the amount of memory consumed by key ciphertext storage on the participant device 302.

In some situations, the participant 312 may wish to grant a target user 314 access to some or all of the conversation 318 (e.g., its encrypted messages 320). The target user 314 may be a new participant in the conversation 318 who wishes to access some or all of the prior conversation history, which occurred before they joined the conversation 318. Alternatively, the target user 314 may not be a participant in the conversation 318 but may still wish to access some or all of the conversation history for various reasons. Either way, the participant 312 can selectively grant the target user 314 access to the conversation history by providing a target secret key 332, which may or may not be the most recent secret key, to the target user 314. The most recent secret key can be the newest secret key that was most recently generated.

For example, the target user 314 can operate a target device 304, which may be any suitable type of client device. The target device 304 can transmit a request 326 to the participant device 302 to access some or all of the conversation history and/or receive a secret key. In reply to the request 326, the participant device 302 can transmit a response 328 to the target device 304, where the response 328 includes the target secret key 332. Alternatively, the participant device 302 can transmit the target secret key 332 to the target device 304 for other reasons, other than in response to a request 326 from the target device 304. Either way, the participant device 302 may not need to transmit any of the older secret keys to the target device 304, because the target device 304 can derive the older secret keys, as explained below.

The target device 304 can receive the target secret key 332 from the participant device 302. The target device 304 can also receive some or all of the encrypted messages 320 and key ciphertexts 330 from the server system 306, for example by downloading them. The target device 304 can then iteratively decrypt the key ciphertexts 330 in a reverse order. For example, if the target secret key 332 is the most recent secret key, the target device 304 can iteratively decrypt the key ciphertexts 330 in a reverse order, starting with the most recent key ciphertext using the most recent secret key. The target device 304 can start from the most recent key ciphertext and work backwards towards the oldest key ciphertext, using the decrypted secret key from each later key ciphertext to sequentially decrypt the immediately prior key ciphertext. Using this approach, the target device 304 can derive some or all of the message keys 310 used to encrypt the messages in the conversation 318. The target device 304 can then decrypt some or all of the encrypted messages 320 using the derived message keys 310, to thereby produce decrypted messages. For example, the target device 304 can decrypt a subset 336 of the encrypted messages 320 using a corresponding message key 334 to obtain a set of decrypted messages 338. The target device 304 may output some or all of the decrypted messages 338, for example in its chat client software.

In some examples, the target device 304 may not obtain and decrypt all of the encrypted messages 320 at the same time. Rather, the target device 304 may obtain and decrypt messages incrementally as needed. For instance, the chat client software may provide a user interface through which the target user 314 can view messages in the conversation 318. By default, the user interface may only show the most recent messages (e.g., the messages sent in the last 24 hours). But, the user interface may also allow the target user 314 to selectively access older messages. For example, the user interface may have a scrollbar that allows the target user 314 to selectively view older messages. As the target user 314 operates the scrollbar to view older messages, the target device 304 may automatically obtain the corresponding encrypted messages 320 from the server system 306 and decrypt them using a corresponding message key. In this way, older messages may be obtained and decrypted in real time as needed, rather than preemptively, to conserve computing resources.

Figure 4:
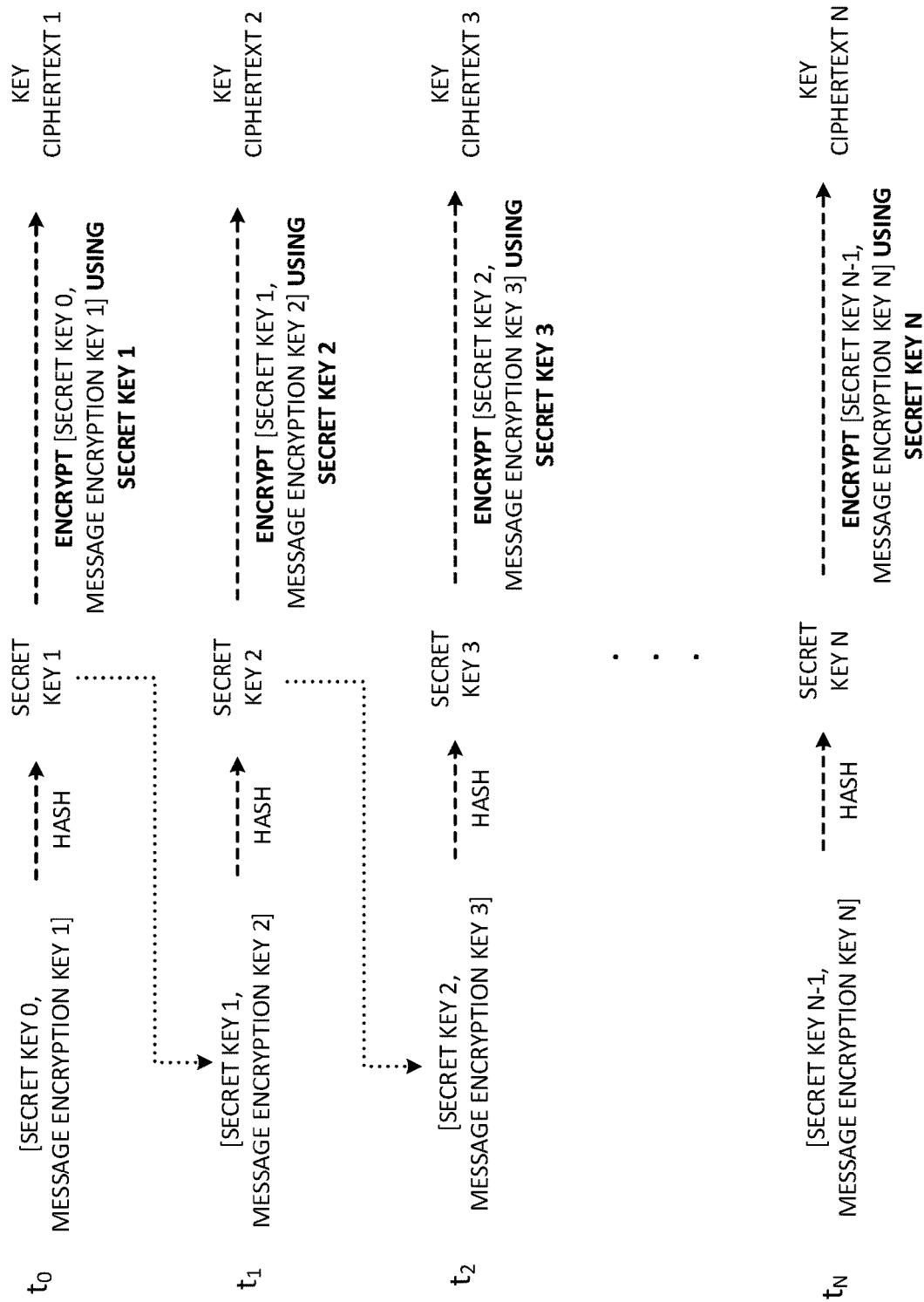
FIG. 4 shows an example of a process for sequentially generating secret keys and ciphertexts according to some aspects of the present disclosure.

Turning now to FIG. 4, shown is an example of a process for sequentially generating secret keys and key ciphertexts according to some aspects of the present disclosure. The process is described below with reference to the components of FIG. 3. The process can begin at time $t_0$ in which the participant device 302 has a default secret key, which can be referred to as Secret Key 0 ($SK_0$). The participant device 302 can then generate a new message key ($MK_1$) for use in encrypting messages in the conversation 318. Now having the new message key and the default secret key, the participant device 302 can hash the new message key and the default secret key to generate a first secret key ($SK_1$). The participant device 302 can then generate a first key ciphertext ($C_1$) based on the new message key ($MK_1$), the default secret key ($SK_0$), and the first secret key ($SK_1$). For example, the participant device 302 can generate the first key ciphertext ($C_1$) by encrypting the new message key and the default secret key using the first secret key. The participant device 302 can then upload the first key ciphertext to the server system 306 and optionally delete the first key ciphertext and/or the default secret key.

At time $t_1$, the participant device 302 can generate a new message key ($MK_2$) for use in encrypting messages in the conversation 318. The new message key is different from the prior message key ($MK_1$). Based on generating the new message key, the participant device 302 can hash the new message key and the prior secret key ($SK_1$) to generate a second secret key ($SK_2$). The participant device 302 can then generate a second key ciphertext ($C_2$) based on the new message key ($MK_2$), the prior secret key ($SK_1$), and the second secret key ($SK_2$). For example, the participant device 302 can generate the second key ciphertext ($C_2$) by encrypting the new message key and the first secret key using the second secret key. The participant device 302 can then upload the second key ciphertext to the server system 306 and optionally delete the second key ciphertext and/or the first secret key.

At time $t_2$, the participant device 302 can generate a new message key ($MK_3$) for use in encrypting messages in the conversation 318. The new message key is different from the prior message keys ($MK_{1-2}$). Based on generating the new message key, the participant device 302 can hash the new message key and the prior secret key ($SK_2$) to generate a third secret key (SKs). The participant device 302 can then generate a third key ciphertext ($C_3$) based on the new message key ($MK_3$), the second secret key ($SK_2$), and the third secret key ($SK_3$). For example, the participant device 302 can generate the third key ciphertext ($C_3$) by encrypting the new message key and the second secret key using the third secret key. The participant device 302 can then upload the third key ciphertext to the server system 306 and optionally delete the third key ciphertext and/or the second secret key.

The above process can continue for additional new message keys generated by the participant device 302 over the course of the conversation. This can result in N message keys and N key ciphertexts, where the $N^{th}$ message key is the most recent message key. The opposite process can be used to decrypt the message keys from the key ciphertexts, as described below.

Figure 5:
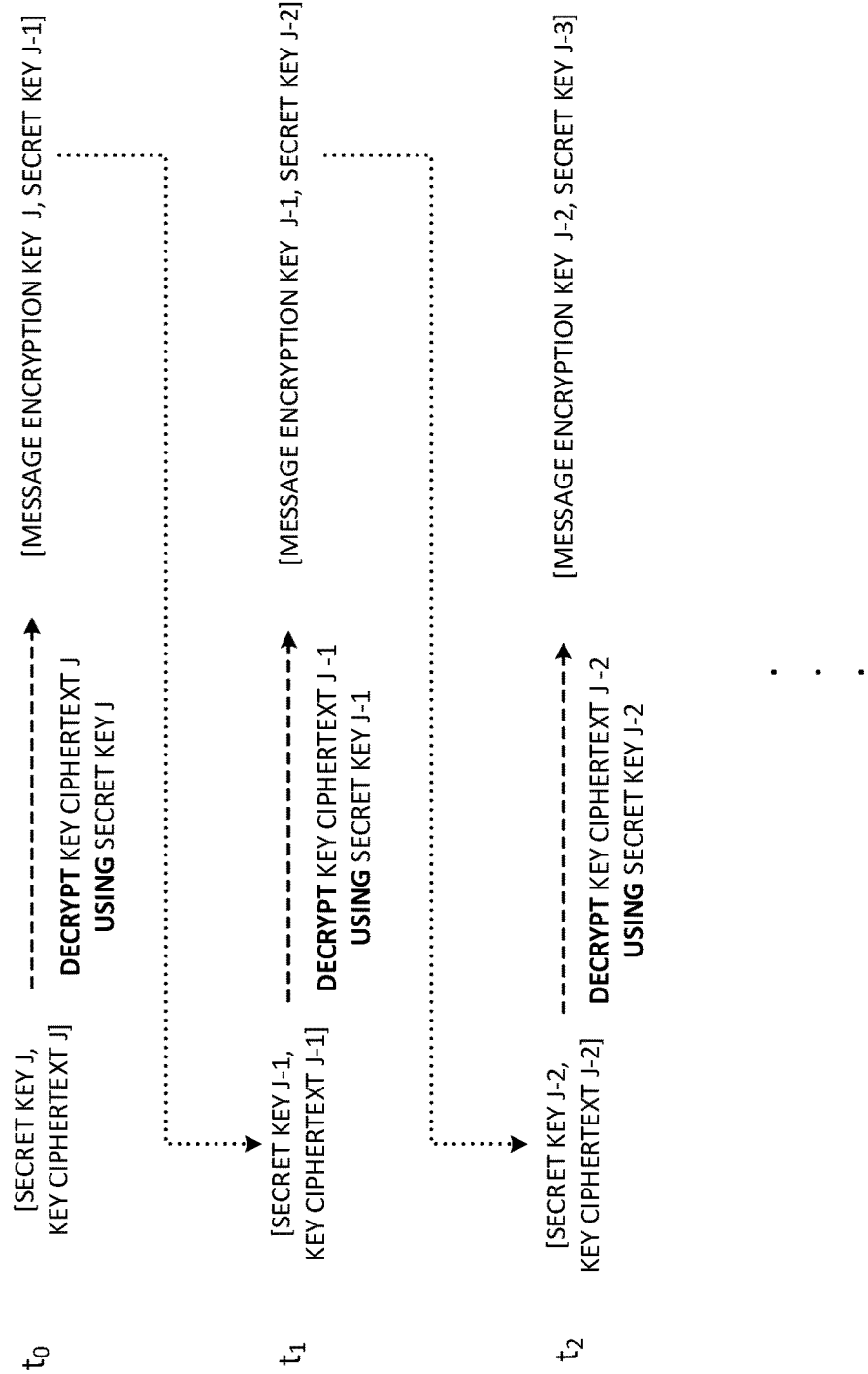
FIG. 5 shows an example of a process for sequentially decrypting ciphertexts according to some aspects of the present disclosure.

Turning now to FIG. 5, shown is an example of a process for sequentially decrypting key ciphertexts according to some aspects of the present disclosure. The process is described below with reference to components of FIG. 3. The process can begin at time to in which the target device 304 receives a target secret key ($SK_j$) and a corresponding key ciphertext ($C_j$). For example, the target device 304 can receive the target secret key from a participant device 302 and retrieve the corresponding key ciphertext from the server system 306. The target secret key may be the most recent secret key, if the target user 314 is to be granted access to the full conversation history, or an older secret key, if the target user 314 is being granted access to just a subset of the conversation history. Now having the target secret key and the corresponding key ciphertext, the target device 304 can decrypt the key ciphertext using the target secret key, to thereby obtain a corresponding message key ($MK_j$) and the prior secret key ($SK_{j-1}$). The target device 304 may then use the message key ($MK_j$) to decrypt a corresponding set of encrypted messages 320 related to the conversation 118.

At time $t_1$, the target device 304 can receive the key ciphertext ($C_{j-1}$) corresponding to the prior secret key ($SK_{j-1}$). For example, the target device 304 can retrieve the key ciphertext ($C_{j-1}$) from the server system 306. The target device 304 can then decrypt the key ciphertext ($C_{j-1}$) using the prior secret key ($SK_{j-1}$), to thereby obtain a corresponding message key ($MK_{j-1}$) and the next prior secret key ($SK_{j-2}$). The target device 304 may then use the message key ($MK_{j-1}$) to decrypt a corresponding set of encrypted messages 320 related to the conversation 118.

At time $t_2$, the target device 304 can receive the key ciphertext ($C_{j-2}$) corresponding to the next prior secret key ($SK_{j-2}$). For example, the target device 304 can retrieve the key ciphertext ($C_{j-2}$) from the server system 306. The target device 304 can then decrypt the key ciphertext ($C_{j-2}$) using the next prior secret key ($SK_{j-2}$), to thereby obtain a corresponding message key ($MK_{j-2}$) and the prior secret key ($SK_{j-3}$). The target device 304 may then use the message key ($MK_{j-2}$) to decrypt a corresponding set of encrypted messages 320 related to the conversation 118. This process can continue for as long as desired by the target device 304 or until there are no further key ciphertexts to decrypt.

Figure 6:
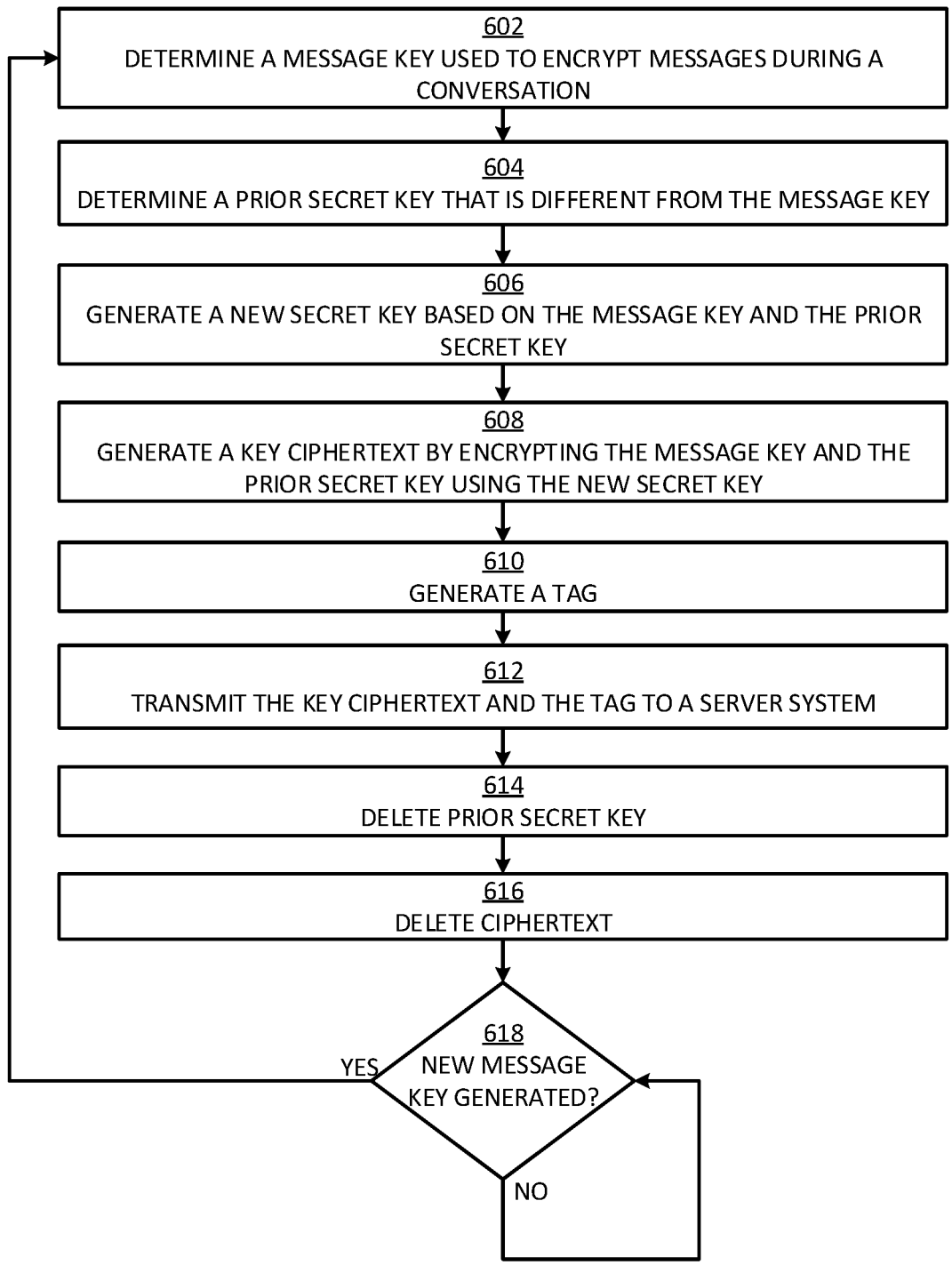
FIG. 6 shows a flowchart of an example of a process for sequentially generating ciphertexts according to some aspects of the present disclosure.

FIG. 6 shows a flowchart of an example of a process for sequentially generating key ciphertexts according to some aspects of the present disclosure. Other examples may include more operations, fewer operations, different operations, or a different sequence of operations than is shown. The process is described below with reference to components of FIG. 3.

In block 602, a participant device 302 determines a message key 310 used to encrypt messages during a conversation 318. In some examples, the participant device 302 may have generated the message key 310 (e.g., using key generator 316). In other examples, the participant device 302 may have received the message key 310 from another device, such as another participant device.

In block 604, the participant device 302 determines a prior secret key 322, which is different from the message key 310 and not used to encrypt messages. In some examples, the participant device 302 may have generated the prior secret key. In other examples, the participant device 302 may have received the prior secret key from another device. The prior secret key can be whichever secret key was active immediately prior to the most recent secret key, or a default value for the first iteration of the process.

In block 606, the participant device 302 generate a new secret key based on the message key 310 and the prior secret key 322. For example, the participant device 302 can generate the new secret key by hashing the message key 310 and the prior secret key 322.

In block 608, the participant device 302 generates a key ciphertext 330 by encrypting the message key and the prior secret key using the new secret key. Thus, the key ciphertext 330 can be an encrypted version of the message key and the prior secret key, which is capable of being decrypted using the new secret key.

In block 610, the participant device 302 generates a tag. A tag can be authentication data usable to validate the key ciphertext 330. In some examples, the participant device 302 can generate the tag (T) by hashing the key ciphertext 330 and a prior tag ($T_{n-1}$) from a prior iteration. For the first iteration, the prior tag ($T_0$) can be set to a predefined default value.

In block 612, the participant device 302 transmits the key ciphertext 330 and the tag to a server system, such as server system 306. The server system may or may not be the same as the server system hosting the conversation and/or storing the conversation history. The participant device 302 can transmit the key ciphertext 330 and the tag to the server system via one or more networks 308.

In block 614, the participant device 302 deletes the prior secret key from memory. The participant device 302 may also delete the message key, for example to conserve memory after key rotation.

In block 616, the participant device 302 deletes the key ciphertext 330 from memory.

In block 618, the participant device 302 determines whether a new message key has been generated. For example, the participant device 302 may generate the new message key in response to detecting an event. As another example, the participant device 302 can receive the new message key from another device, which in turn may have generated the new message key in response to detecting an event. If a new message key has been generated, the process can return to block 602 and repeat, for example by using the new message key to generate a new key ciphertext. Otherwise, the process can wait until a new message key is generated.

Figure 7:
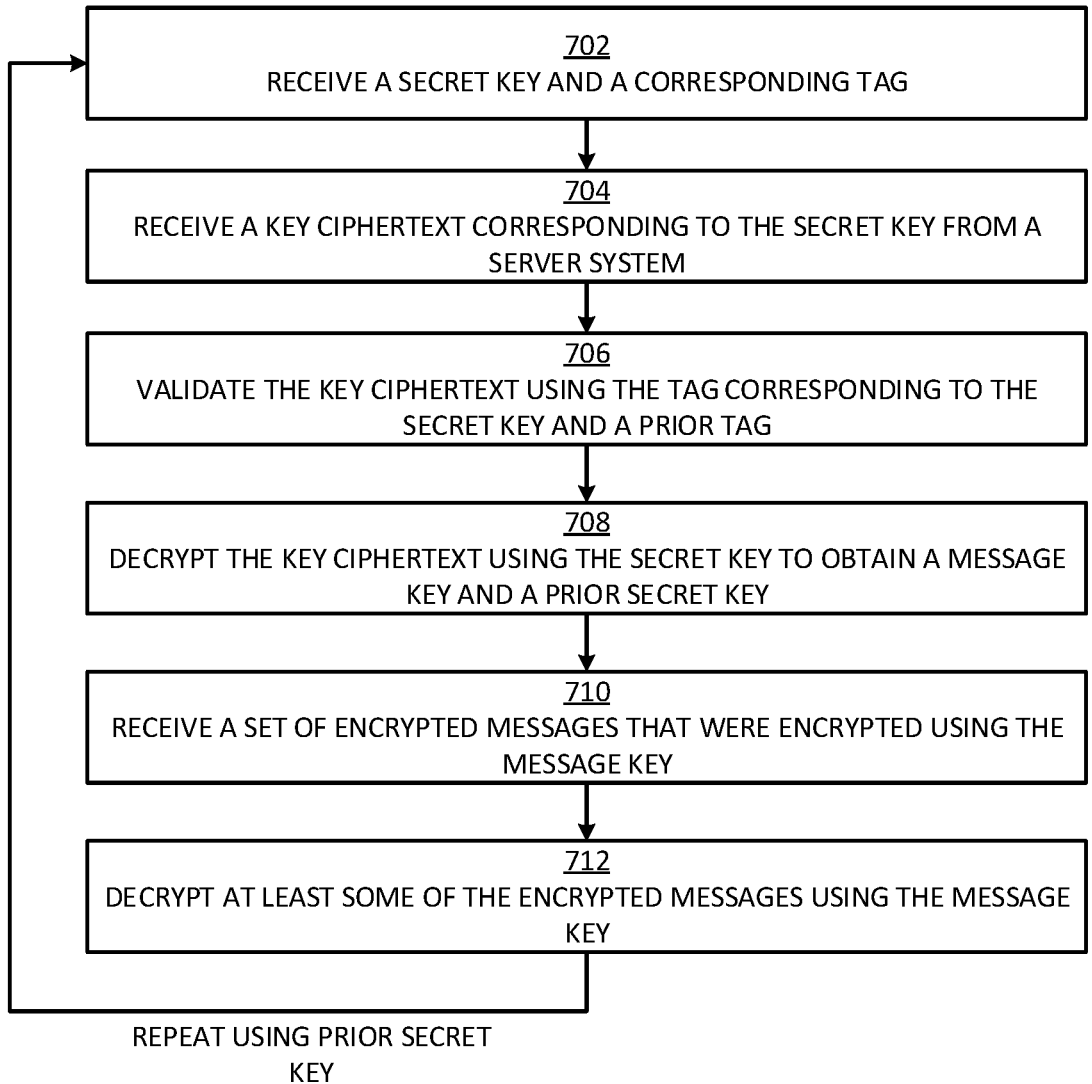
FIG. 7 shows a flowchart of an example of a process for decrypting encrypted messages according to some aspects of the present disclosure.

FIG. 7 shows a flowchart of an example of a process for decrypting encrypted messages according to some aspects of the present disclosure. Other examples may include more operations, fewer operations, different operations, or a different sequence of operations than is shown. The process is described below with reference to components of FIG. 3.

In block 702, a target device 304 determines a target secret key 332 (e.g., the most recent secret key or an older secret key). For example, the target device 304 can receive the target secret key 332 from a participant device 302 that participated in the conversation 318. The participant device 302 can transmit the target secret key 332 to the target device 304 via one or more networks 308, which may include a private network (e.g., a local area network) and/or a public network (e.g., the Internet). Alternatively, the target device 304 may already have the target secret key 332 stored in memory and may retrieve it from memory. Alternatively, the target device 304 can receive the target secret key 332 from another source.

The target device 304 can also determine a tag corresponding to the target secret key 332. For example, the target device 304 can receive the tag from the participant device 302. The participant device 302 can transmit the tag to the target device 304. Alternatively, the target device 304 may already have the tag stored in memory and may retrieve it from memory. Alternatively, the target device 304 can receive the tag from another source.

In block 704, the target device 304 receives a key ciphertext 330 from a server system, such as server system 306. For example, the target device 304 can download the key ciphertext 330 from a repository hosted by the server system. The key ciphertext 330 can correspond to the target secret key 332 in that it was encrypted using the target secret key 332.

In block 706, the target device 304 validates the key ciphertext 330 using the tag corresponding to the secret key and a prior tag. For example, the target device 304 can obtain the prior tag from the server system, where the prior tag is a tag generated for the immediately prior key ciphertext 330. For instance, if the key ciphertext 330 is $C_n$ and the corresponding tag is $T_n$, then the immediately prior ciphertext is $C_{n-1}$ and the prior tag is $T_{n-1}$. The target device 304 can then hash the key ciphertext 330 ($C_n$) and the prior tag ($T_{n-1}$) to generate an expected tag ($T_{n\_expected}$). The target device 304 can compare the expected tag to the actual tag ($T_n$), which the target device 304 may already have stored in memory. For example, as noted in block 702 above, the target device 304 may have received the tag ($T_n$) from the participant device along with the target secret key 332. If the two match, then the key ciphertext 330 is valid. Otherwise, the key ciphertext 330 is invalid. If the target device 304 determines that the key ciphertext 330 is invalid, it may skip the rest of the steps and throw an error. This validation process may help ensure that the key ciphertext 330 is correct.

In block 708, the target device 304 decrypts the key ciphertext 330 using the target secret key 332 to obtain a message key 334 and a prior secret key.

In block 710, the target device 304 receives a set of encrypted messages 336 that were encrypted using the message key 334 and therefore can be decrypted using the message key 334. The target device 304 can receive the set of encrypted messages 336 from the same server system that is storing the key ciphertexts 330 or from another server system. For instance, the key ciphertexts and the encrypted messages 336 may be stored on different server systems from one another. And those server systems may be operated by different entities from one another.

In block 712, the target device 304 decrypts at least some of the encrypted messages 320 using the message key 334. For example, the target device 304 can decrypt some or all of the encrypted messages 336 using the message key 334.

In some examples, blocks 710-712 may be skipped if the target device 304 is not interested in decrypting any of the encrypted messages corresponding to the message key 334.

In some examples, the process can return to block 702 and iterate, with the target device 304 using the prior secret key as the "secret key". This process can repeat any number of times, for example until there are no more key ciphertexts associated with the conversation 318 left to decrypt, or until the target device 304 has obtained a desired message key for use in decrypting a desired set of encrypted messages.

Figure 8:
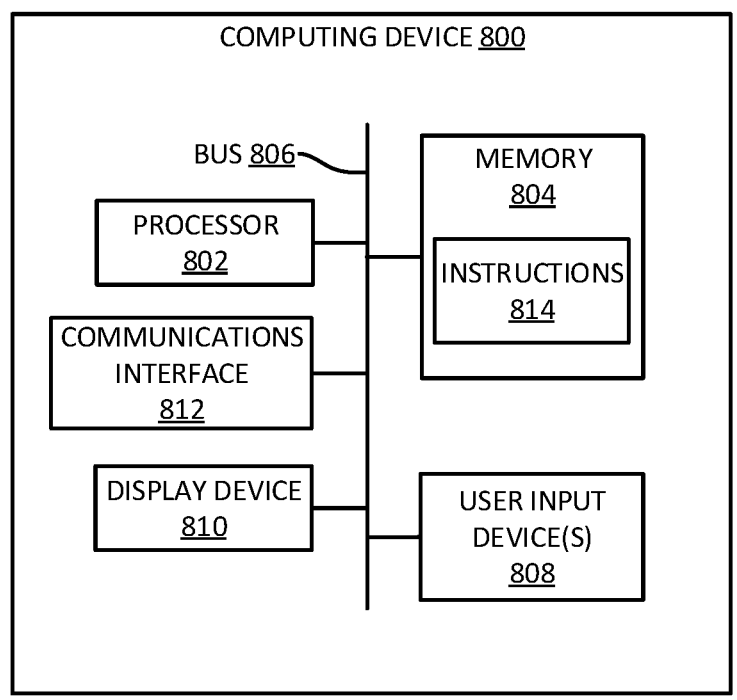
FIG. 8 shows a block diagram of an example of a computing device usable to implement some aspects of the present disclosure.

Turning now to FIG. 8, shown is a block diagram of an example of a computing device 800 usable to implement some aspects of the present disclosure. In some examples, the computing device 800 may correspond to any of the client devices or videoconference providers described above.

The computing device 800 includes a processor 802 that is in communication with the memory 804 and other components of the computing device 800 using one or more communications buses 806. The processor 802 is configured to execute processor-executable instructions 814 stored in the memory 804 to perform one or more processes described herein.

As shown, the computing device 800 also includes one or more user input devices 808 (e.g., a keyboard, mouse, touchscreen, video capture device, and/or microphone) to accept user input and the display device 810 to provide visual output to a user. The computing device 800 further includes a communications interface 812. In some examples, the communications interface 812 may enable communications using one or more networks, including a local area network ("LAN"); wide area network ("WAN"), such as the Internet; metropolitan area network ("MAN"); point-to-point or peer-to-peer connection; etc. Communication with other devices may be accomplished using any suitable networking protocol. For example, one suitable networking protocol may include the Internet Protocol ("IP"), Transmission Control Protocol ("TCP"), User Datagram Protocol ("UDP"), or combinations thereof, such as TCP/IP or UDP/IP.

While some examples of methods and systems herein are described in terms of software executing on various machines, the methods and systems may also be implemented as specifically-configured hardware, such as field-programmable gate array (FPGA) specifically to execute the various methods according to this disclosure. For example, examples can be implemented in digital electronic circuitry, or in computer hardware, firmware, software, or in a combination thereof. In one example, a device may include a processor or processors. The processor comprises a computer-readable medium, such as a random access memory (RAM) coupled to the processor. The processor executes computer-executable program instructions stored in memory, such one or more computer programs. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example one or more non-transitory computer-readable media, that may store processor-executable instructions that, when executed by the processor, can cause the processor to perform methods according to this disclosure as carried out, or assisted, by a processor. Examples of non-transitory computer-readable medium may include, but are not limited to, an electronic, optical, magnetic, or other storage device capable of providing a processor, such as the processor in a videoconferencing server, with processor-executable instructions. Other examples of non-transitory computer-readable media include, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code to carry out methods (or parts of methods) according to this disclosure.

Certain aspects and features can be implemented according to one or more of the following examples. As used below, any reference to a series of examples is to be understood as reference to each of those examples disjunctively (E.g., "Examples 1-4" is to be understood as Examples 1, 2, 3, or 4").

Example #1: A method comprising: determining, by a first client device, a message key used to encrypt messages associated with a conversation; generating, by the first client device, a key ciphertext corresponding to the message key by: determining a prior secret key that is different from the message key; determining a current secret key by hashing the prior secret key and the message key; and generating the key ciphertext by encrypting the prior secret key and the message key using the current secret key; and transmitting, by the first client device, the key ciphertext to a server system that is remote from the first client device, wherein a second client device is configured to receive the key ciphertext from the server system and decrypt the key ciphertext using the current secret key to derive the message key and decrypt the messages.

Example #2: The method of Example #1, wherein the first client device is associated with a participant in the conversation, and further comprising: generating, by the first client device, the message key during the conversation; and transmitting, by the first client device, the message key to other client devices associated with other participants in the conversation, the other client devices being configured to use the message key to encrypt and/or decrypt at least some of the messages.

Example #3: The method of any of Examples #1-2, further comprising, subsequent to transmitting the key ciphertext to the server system: deleting, by the first client device, the key ciphertext and the prior secret key from memory.

Example #4: The method of any of Examples #1-3, wherein the server system is configured to host the conversation, and wherein the server system is configured to store an encrypted conversation history including the messages.

Example #5: The method of any of Examples #1-4, further comprising: providing, by the first client device, the current secret key to the second client device.

Example #6: The method of any of Examples #1-5, further comprising: sequentially generating, by the first client device, a plurality of message keys for encrypting a plurality of messages during the conversation, each message key of the plurality of message keys being for encrypting a corresponding subset of messages in the plurality of messages; sequentially generating, by the first client device, a plurality of key ciphertexts based on the plurality of message keys, each key ciphertext of the plurality of key ciphertexts being generated using (i) a respective message key, (ii) a respective prior secret key, and (iii) a respective current secret key; and transmitting, by the first client device, the plurality of key ciphertexts to the server system.

Example #7: The method of Example #6, wherein the second client device is configured to: receive the plurality of key ciphertexts from the server system; iteratively decrypt the plurality of key ciphertexts in a reverse order of generation, starting from the key ciphertext corresponding to the current secret key, to derive the plurality of message keys; decrypt a plurality of encrypted messages associated with the conversation using the plurality of message keys.

Example #8: The method of any of Examples #1-7, wherein the prior secret key is a predefined default value.

Example #9: A first client device comprising: one or more processors; and one or more memories including instructions that are executable by the one or more processors to cause the one or more processors to: determine a message key used to encrypt messages associated with a conversation; generate a key ciphertext corresponding to the message key by: determining a prior secret key that is different from the message key; determining a current secret key by hashing the prior secret key and the message key; and generating the key ciphertext by encrypting the prior secret key and the message key using the current secret key; and transmit the key ciphertext to a server system that is remote from the first client device, wherein a second client device is configured to receive the key ciphertext from the server system and decrypt the key ciphertext using the current secret key to derive the message key and decrypt the messages.

Example #10: The first client device of Example #9, wherein the first client device is associated with a participant in the conversation, and wherein the one or more memories further include instructions that are executable by the one or more processors to cause the one or more processors to: generate the message key during the conversation; and transmit the message key to other client devices associated with other participants in the conversation, the other client devices being configured to use the message key to encrypt and/or decrypt at least some of the messages.

Example #11: The first client device of any of Examples #9-10, wherein the one or more memories further include instructions that are executable by the one or more processors to cause the one or more processors to, subsequent to transmitting the key ciphertext to the server system: delete the key ciphertext from memory.

Example #12: The first client device of any of Examples #9-11, wherein the server system is configured to host the conversation, and wherein the server system is configured to store an encrypted conversation history including the messages.

Example #13: The first client device of any of Examples #9-12, wherein the one or more memories further include instructions that are executable by the one or more processors to cause the one or more processors to: receive a request from the second client device; and in response to receiving the request, provide the current secret key to the second client device.

Example #14: The first client device of any of Examples #9-13, wherein the second client device is configured to: receive the current secret key from the first client device; retrieve the key ciphertext from the server system; decrypt the key ciphertext to derive the message key; and decrypt at least some of the messages using the message key.

Example #15: The first client device of any of Examples #9-14, wherein the one or more memories further include instructions that are executable by the one or more processors to cause the one or more processors to: sequentially generate a plurality of message keys during the conversation; sequentially generate a plurality of key ciphertexts based on the plurality of message keys, each key ciphertext of the plurality of key ciphertexts being generated using (i) a respective message key, (ii) a respective prior secret key, and (iii) a respective current secret key; and sequentially transmit the plurality of key ciphertexts to the server system.

Example #16: The first client device of any of Examples #9-15, wherein the prior secret key is a predefined default value.

Example #17: A non-transitory computer-readable medium comprising program code that is executable by one or more processors to cause the one or more processors to: determine a message key used to encrypt messages associated with a conversation; generate a key ciphertext corresponding to the message key by: determining a prior secret key that is different from the message key; determining a current secret key by hashing the prior secret key and the message key; and generating the key ciphertext by encrypting the prior secret key and the message key using the current secret key; and transmit the key ciphertext to a server system, wherein a client device is configured to receive the key ciphertext from the server system and decrypt the key ciphertext using the current secret key to derive the message key and decrypt the messages.

Example #18: The non-transitory computer-readable medium of Example #17, further comprising program code that is executable by the one or more processors to cause the one or more processors to: generate the message key during the conversation; and transmit the message key to other client devices associated with other participants in the conversation, the other client devices being configured to use the message key to encrypt and/or decrypt at least some of the messages.

Example #19: The non-transitory computer-readable medium of any of Examples #17-18, wherein the client device is configured to: receive the current secret key; retrieve the key ciphertext from the server system; decrypt the key ciphertext to derive the message key; and decrypt at least some of the messages using the message key.

Example #20: The non-transitory computer-readable medium of any of Examples #17-19, further comprising program code that is executable by the one or more processors to cause the one or more processors to: sequentially generate a plurality of message keys during the conversation; sequentially generate a plurality of key ciphertexts based on the plurality of message keys, each key ciphertext of the plurality of key ciphertexts being generated using (i) a respective message key, (ii) a respective prior secret key, and (iii) a respective current secret key; and transmit the plurality of key ciphertexts to the server system.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in one implementation," or "in an implementation," or variations thereof in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

The invention claimed is:

1. A method comprising:
   determining, by a first client device, a message key used to encrypt messages associated with a conversation;
   generating, by the first client device, a key ciphertext corresponding to the message key by:
      determining a prior secret key that is different from the message key;
      determining a current secret key by hashing the prior secret key and the message key; and
      generating the key ciphertext by encrypting the prior secret key and the message key using the current secret key; and
   transmitting, by the first client device, the key ciphertext to a server system that is remote from the first client device, wherein a second client device is configured to receive the key ciphertext from the server system and decrypt the key ciphertext using the current secret key to derive the message key and decrypt the messages.

2. The method of claim 1, wherein the first client device is associated with a participant in the conversation, and further comprising:
   generating, by the first client device, the message key during the conversation; and
   transmitting, by the first client device, the message key to other client devices associated with other participants in the conversation, the other client devices being configured to use the message key to encrypt and/or decrypt at least some of the messages.

3. The method of claim 1, further comprising, subsequent to transmitting the key ciphertext to the server system:
   deleting, by the first client device, the key ciphertext and the prior secret key from memory.

4. The method of claim 1, wherein the server system is configured to host the conversation, and wherein the server system is configured to store an encrypted conversation history including the messages.

5. The method of claim 1, further comprising:
   providing, by the first client device, the current secret key to the second client device.

6. The method of claim 1, further comprising:
   sequentially generating, by the first client device, a plurality of message keys for encrypting a plurality of messages during the conversation, each message key of the plurality of message keys being for encrypting a corresponding subset of messages in the plurality of messages;
   sequentially generating, by the first client device, a plurality of key ciphertexts based on the plurality of message keys, each key ciphertext of the plurality of key ciphertexts being generated using (i) a respective message key, (ii) a respective prior secret key, and (iii) a respective current secret key; and
   transmitting, by the first client device, the plurality of key ciphertexts to the server system.

7. The method of claim 6, wherein the second client device is configured to:
  receive the plurality of key ciphertexts from the server system;
  iteratively decrypt the plurality of key ciphertexts in a reverse order of generation, starting from the key ciphertext corresponding to the current secret key, to derive the plurality of message keys;
  decrypt a plurality of encrypted messages associated with the conversation using the plurality of message keys.

8. The method of claim 1, wherein the prior secret key is a predefined default value.

9. A first client device comprising:
  one or more processors; and
  one or more memories including instructions that are executable by the one or more processors to cause the one or more processors to:
    determine a message key used to encrypt messages associated with a conversation;
    generate a key ciphertext corresponding to the message key by:
      determining a prior secret key that is different from the message key;
      determining a current secret key by hashing the prior secret key and the message key; and
      generating the key ciphertext by encrypting the prior secret key and the message key using the current secret key; and
    transmit the key ciphertext to a server system that is remote from the first client device, wherein a second client device is configured to receive the key ciphertext from the server system and decrypt the key ciphertext using the current secret key to derive the message key and decrypt the messages.

10. The first client device of claim 9, wherein the first client device is associated with a participant in the conversation, and wherein the one or more memories further include instructions that are executable by the one or more processors to cause the one or more processors to:
  generate the message key during the conversation; and
  transmit the message key to other client devices associated with other participants in the conversation, the other client devices being configured to use the message key to encrypt and/or decrypt at least some of the messages.

11. The first client device of claim 9, wherein the one or more memories further include instructions that are executable by the one or more processors to cause the one or more processors to, subsequent to transmitting the key ciphertext to the server system:
  delete the key ciphertext from memory.

12. The first client device of claim 9, wherein the server system is configured to host the conversation, and wherein the server system is configured to store an encrypted conversation history including the messages.

13. The first client device of claim 9, wherein the one or more memories further include instructions that are executable by the one or more processors to cause the one or more processors to:
  receive a request from the second client device; and
  in response to receiving the request, provide the current secret key to the second client device.

14. The first client device of claim 9, wherein the second client device is configured to:
  receive the current secret key from the first client device;
  retrieve the key ciphertext from the server system;
  decrypt the key ciphertext to derive the message key; and
  decrypt at least some of the messages using the message key.

15. The first client device of claim 9, wherein the one or more memories further include instructions that are executable by the one or more processors to cause the one or more processors to:
  sequentially generate a plurality of message keys during the conversation;
  sequentially generate a plurality of key ciphertexts based on the plurality of message keys, each key ciphertext of the plurality of key ciphertexts being generated using (i) a respective message key, (ii) a respective prior secret key, and (iii) a respective current secret key; and
  sequentially transmit the plurality of key ciphertexts to the server system.

16. The first client device of claim 9, wherein the prior secret key is a predefined default value.

17. A non-transitory computer-readable medium comprising program code that is executable by one or more processors to cause the one or more processors to:
  determine a message key used to encrypt messages associated with a conversation;
  generate a key ciphertext corresponding to the message key by:
    determining a prior secret key that is different from the message key;
    determining a current secret key by hashing the prior secret key and the message key; and
    generating the key ciphertext by encrypting the prior secret key and the message key using the current secret key; and
  transmit the key ciphertext to a server system, wherein a client device is configured to receive the key ciphertext from the server system and decrypt the key ciphertext using the current secret key to derive the message key and decrypt the messages.

18. The non-transitory computer-readable medium of claim 17, further comprising program code that is executable by the one or more processors to cause the one or more processors to:
  generate the message key during the conversation; and
  transmit the message key to other client devices associated with other participants in the conversation, the other client devices being configured to use the message key to encrypt and/or decrypt at least some of the messages.

19. The non-transitory computer-readable medium of claim 17, wherein the client device is configured to:
  receive the current secret key;
  retrieve the key ciphertext from the server system;
  decrypt the key ciphertext to derive the message key; and
  decrypt at least some of the messages using the message key.

20. The non-transitory computer-readable medium of claim 17, further comprising program code that is executable by the one or more processors to cause the one or more processors to:
  sequentially generate a plurality of message keys during the conversation;
  sequentially generate a plurality of key ciphertexts based on the plurality of message keys, each key ciphertext of the plurality of key ciphertexts being generated using (i) a respective message key, (ii) a respective prior secret key, and (iii) a respective current secret key; and transmit the plurality of key ciphertexts to the server system.

* * * * *